(12) United States Patent
Thomas et al.

(10) Patent No.: US 6,997,304 B2
(45) Date of Patent: Feb. 14, 2006

(54) ACCUMULATING CONVEYOR

(76) Inventors: Timothy N. Thomas, 20400 Martin Rd., St. Clair Shores, MI (US) 48080; Bradley R. Carver, 25515 Normandy Rd., Roseville, MI (US) 48066

( * ) Notice: Subject to any disclaimer, the term of this patent is extended or adjusted under 35 U.S.C. 154(b) by 75 days.

(21) Appl. No.: 10/744,658

(22) Filed: Dec. 23, 2003

(65) Prior Publication Data

US 2004/0168883 A1 Sep. 2, 2004

Related U.S. Application Data

(60) Provisional application No. 60/458,130, filed on Mar. 27, 2003, provisional application No. 60/436,084, filed on Dec. 23, 2002.

(51) Int. Cl.
*B65G 37/00* (2006.01)
(52) U.S. Cl. .................................. 198/465.3; 198/803.2
(58) Field of Classification Search ............. 198/465.3, 198/803.2
See application file for complete search history.

(56) References Cited

U.S. PATENT DOCUMENTS

| | | | | |
|---|---|---|---|---|
| 4,060,164 A | * | 11/1977 | Reilly | 198/418.6 |
| 4,681,212 A | | 7/1987 | Miller | 198/803.2 |
| 4,712,670 A | * | 12/1987 | Burkhardt | 198/867.13 |
| 4,757,893 A | * | 7/1988 | Shabram et al. | 198/474.1 |
| 4,776,453 A | | 10/1988 | Miller | 198/803.1 |
| 4,896,793 A | | 1/1990 | Briggs et al. | 221/73 |
| 4,934,515 A | * | 6/1990 | Linden | 198/803.2 |
| 5,029,691 A | | 7/1991 | Fein et al. | 198/346.1 |
| 5,070,996 A | | 12/1991 | Schwaemmle et al. | 198/465.3 |
| 5,178,261 A | | 1/1993 | Matheson et al. | 198/803.2 |
| 5,220,996 A | | 6/1993 | Noestheden | 198/465.1 |
| 5,282,529 A | | 2/1994 | Schwammle | 198/465.3 |
| 5,388,685 A | * | 2/1995 | Szuba | 198/803.2 |
| 5,407,058 A | | 4/1995 | Gyger | 198/465.3 |
| 5,411,130 A | | 5/1995 | Noestheden | 198/457 |
| 5,449,062 A | | 9/1995 | McTaggart | 198/774.3 |
| 5,465,826 A | | 11/1995 | Noestheden | 198/465.3 |
| 5,465,862 A | | 11/1995 | Devlin | 220/335 |
| 5,495,933 A | | 3/1996 | Gyger | 198/465.3 |
| 5,524,748 A | | 6/1996 | McTaggart | 198/774.3 |
| 5,544,735 A | | 8/1996 | Gyger | 198/465.3 |
| 5,617,944 A | | 4/1997 | McTaggart | 198/468.6 |
| 5,653,329 A | | 8/1997 | McTaggart | 198/774.1 |
| 5,873,452 A | | 2/1999 | Nolan | 198/465.3 |
| 5,940,961 A | | 8/1999 | Parete | 29/784 |
| 5,943,768 A | | 8/1999 | Ray | 29/822 |
| 6,047,813 A | * | 4/2000 | Herzog et al. | 198/803.2 |
| 6,155,402 A | | 12/2000 | Murphy | 198/346.2 |

(Continued)

*Primary Examiner*—Douglas Hess
(74) *Attorney, Agent, or Firm*—Young & Basile, P.C.

(57) ABSTRACT

A preferred embodiment of an accumulating conveyor system has at least one shoe slideably connected to an endless chain. Each shoe includes a pair of opposing rollers, one of which is engageable with the endless chain when the shoe is positioned adjacent an upper support member, and the other is engageable with the endless chain when the shoe is positioned adjacent a lower support member. The shoe further includes a transverse roller attached to a body of the shoe and engageable with the upper and lower support members. In another aspect of the present invention, a workpiece support may be detachably connected to two shoes positioned on opposite sides of the conveyor system to form a pallet. In yet another aspect of the present invention, two or more pallets may be connected together using an anti back-flex chain to form a pallet assembly.

20 Claims, 9 Drawing Sheets

U.S. PATENT DOCUMENTS

| | | | |
|---|---|---|---|
| 6,364,600 B1 | 4/2002 | Baulier et al. | 414/754 |
| 6,418,603 B1 | 7/2002 | Baluta | 29/281.5 |
| 6,439,371 B1 | 8/2002 | Baulier | 198/468.2 |
| 6,443,293 B1 * | 9/2002 | Patrito | 198/803.2 |
| 6,454,082 B1 | 9/2002 | McTaggart et al. | 198/781.02 |
| 2001/0025787 A1 | 10/2001 | Bethke et al. | 198/617 |

* cited by examiner

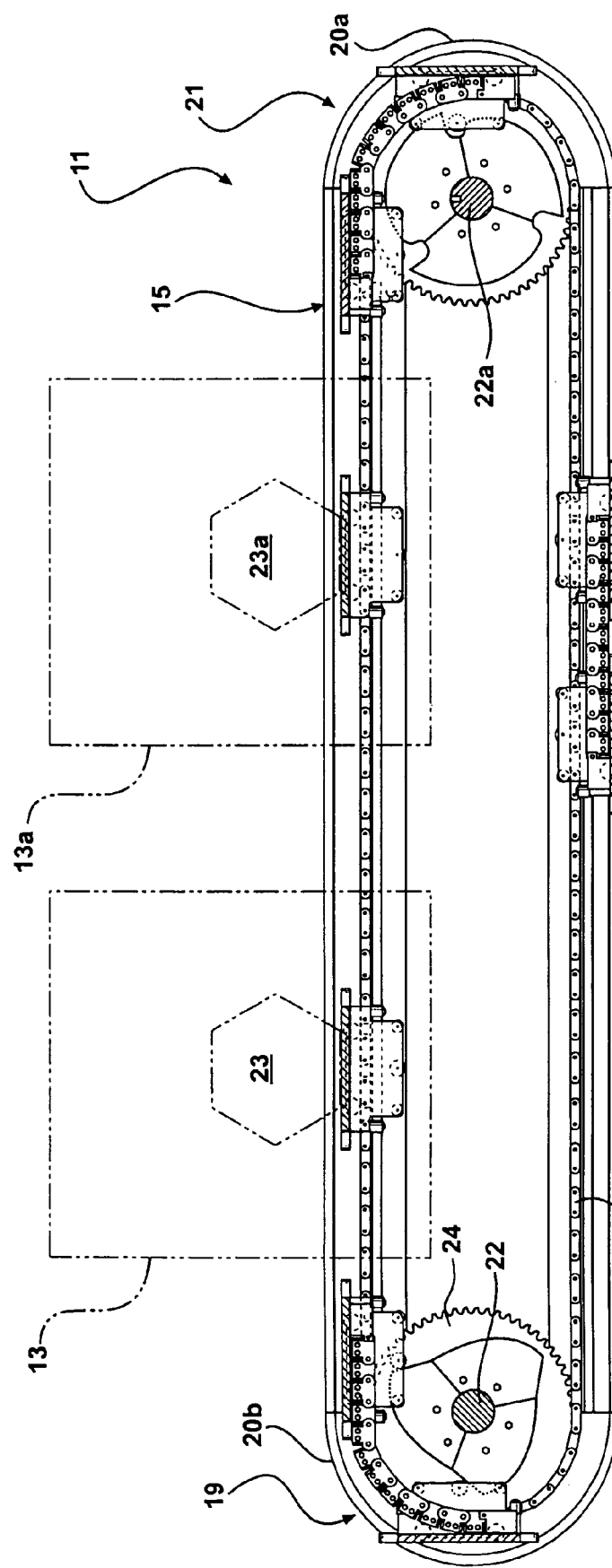
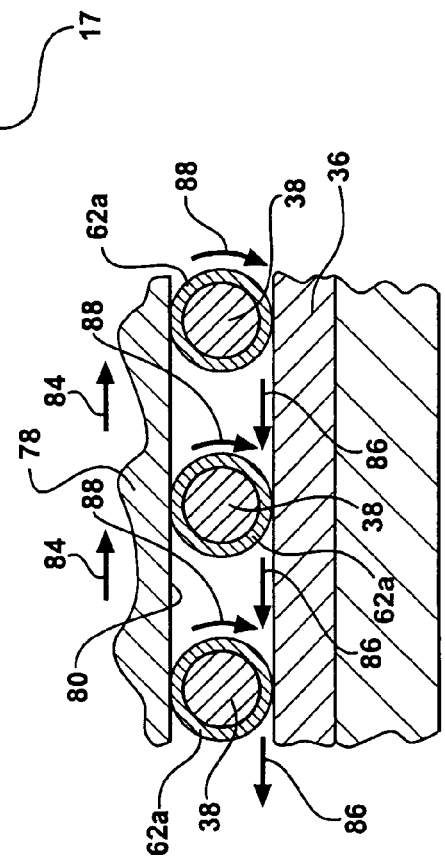
FIG - 15
FIG - 16

ACCUMULATING CONVEYOR

RELATED APPLICATIONS

This application is a continuation of U.S. Provisional Application Ser. No. 60/436,084 filed Dec. 23, 2002, and U.S. Provisional Application Ser. No. 60/458,130 filed Mar. 27, 2003.

FIELD OF THE INVENTION

The invention relates to an accumulating conveyor and, more specifically, to an accumulating conveyor for moving pallet assemblies with an endless chain along upper and lower runs as well as turnaround portions.

BACKGROUND OF THE INVENTION

An accumulating conveyor system can provide an endless chain and several workpiece carrying devices, such as pallets, that are associated with the conveyor chain. Existing accumulating conveyors are not as reliable or efficient as desired. The reliability of the accumulating conveyor can be compromised when pallets become misaligned with respect to the conveyor chain. In addition, the efficiency of existing conveyor systems is compromised when pallets are immovably associated with respect to the conveyor chain. When the chain is stopped, all the workpieces moving along the conveyor line stop as well.

SUMMARY OF THE INVENTION

The present invention provides an accumulating conveyor having a left-hand portion and a right-hand portion, each portion including an endless conveyor chain. Pallets are movable along the conveyor chains from a beginning of the accumulating conveyor to an end of the accumulating conveyor along upper and lower runs. The pallets are movably associated with respect to the endless chains. The pallets include shoes that ride on the endless chains. Specifically, the shoes ride on bushings disposed between chain links. The shoes and associated pallets can be moved faster than the chain.

The accumulating conveyor includes four differently configured cams individually disposed at the four corners of the accumulating conveyor. The cams reduce the likelihood the pallets will become misaligned with respect to the conveyor chains and move pallets between a top and bottom portions of the accumulating conveyor.

Two pallets can be engaged with respect to one another with an anti-back flex chain provided by the present invention. The chain is operable to bend in one direction.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 15 is a schematic side view of a path defined by the accumulating conveyor showing workstations positioned along the top portion of the path; and FIG. 16 is a detailed cross-sectional view of the engagement of the shoe with respect to the chain.

DESCRIPTION OF THE PREFERRED EMBODIMENT

Various embodiments of the invention are shown throughout the figures. The figures include common elements in different structural configurations. Common elements are designated with a common base numeral and differentiated with an alphabetic designation.

Figure 1:
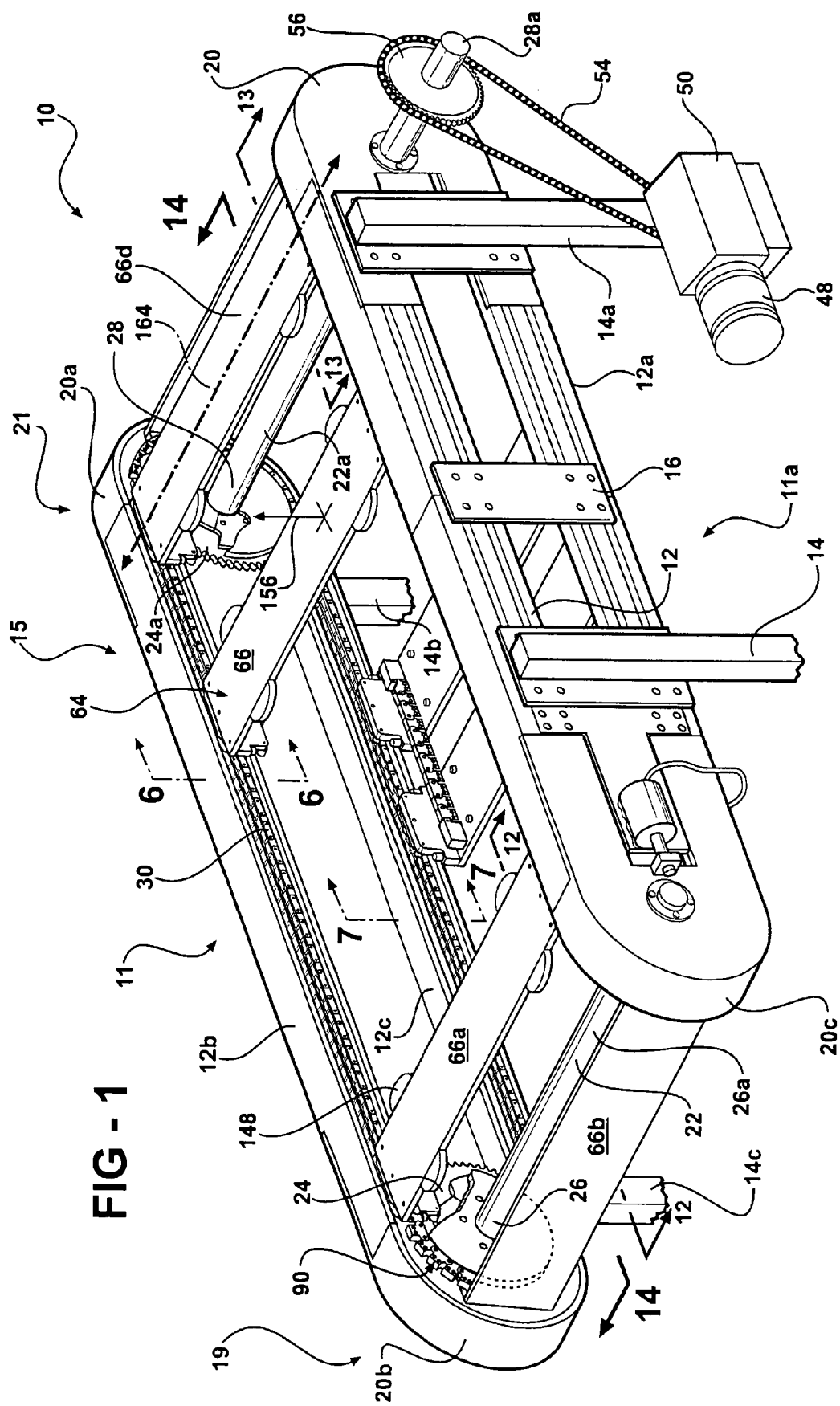
FIG. 1 is an isometric view of an accumulating conveyor according to the invention.

Referring now to FIGS. 1 and 15, an accumulating conveyor 10 defines paths 11 and 11a and moves workpieces along the paths 11 and 11a. The path 11 can be a closed loop or endless path having a first or top portion or upper run 15, a second or bottom portion or lower run 17, a first angular portion or first turnaround portion 19, and a second angular portion or second turnaround portion 21. One or more workstations 13 and 13a can be positioned along the path 11. Each of the workstations 13 and 13a can be one of a loading, unloading and processing station. Workpieces 23 and 23a can be moved along the top portion 15 of the path 11 to be processed at workstations 13 and 13a. Processing can include welding, painting, assembling, piercing, drilling, cutting, sanding, packaging and/or inspecting. Pallet assemblies, to be described in greater detail below, can support workpieces 23 and 23a during movement along the top portion 15. The pallet assemblies are movable along the length of the path 11.

Referring to FIGS. 1–7 and 12–14, with the exception of cams to be described below, a right-hand side of the conveyor 10 is substantially a mirror image of the left-hand side of the conveyor 10 when viewed about a longitudinal axis of the conveyor 10. The conveyor 10 includes a plurality of members operably associated with respect to one another for supporting movement of endless chains 30 and 30a, which are movable along paths 11 and 11a, respectively. Paths 11 and 11a are substantially parallel.

Conveyor 10 includes longitudinal support members 12–12c supported in a spaced relationship with respect to a support surface such as a manufacturing floor. Longitudinal support members 12–12c are supported in a spaced relationship with respect to one another using risers 14–14c. Conveyor 10 includes two top opposing longitudinal support members, top right-hand longitudinal support member 12 and top left-hand longitudinal support member 12b. Conveyor 10 also includes two bottom opposing longitudinal support members, bottom right-hand longitudinal support member 12a and bottom left-hand longitudinal support member 12c.

The longitudinal support members 12–12c can be any desired length. For example, each of the longitudinal members 12–12c are shown constructed of a single continuous piece of material, but each member can also be constructed from a plurality of shorter members. Also, the conveyor 10 can include as many risers as desired.

The longitudinal support members 12–12c support chains 30 and 30a during movement along paths 11 and 11a, respectively. The longitudinal support members 12–12c also support movement of shoes, pallets and pallet assemblies, as described in greater detail below, while being moved along paths 11 and 11a. The longitudinal support members 12–12c can also be used to support various fixtures, locators, sensors, actuators, and the like, which can be disposed along the paths 11 and 11a.

Figure 6:
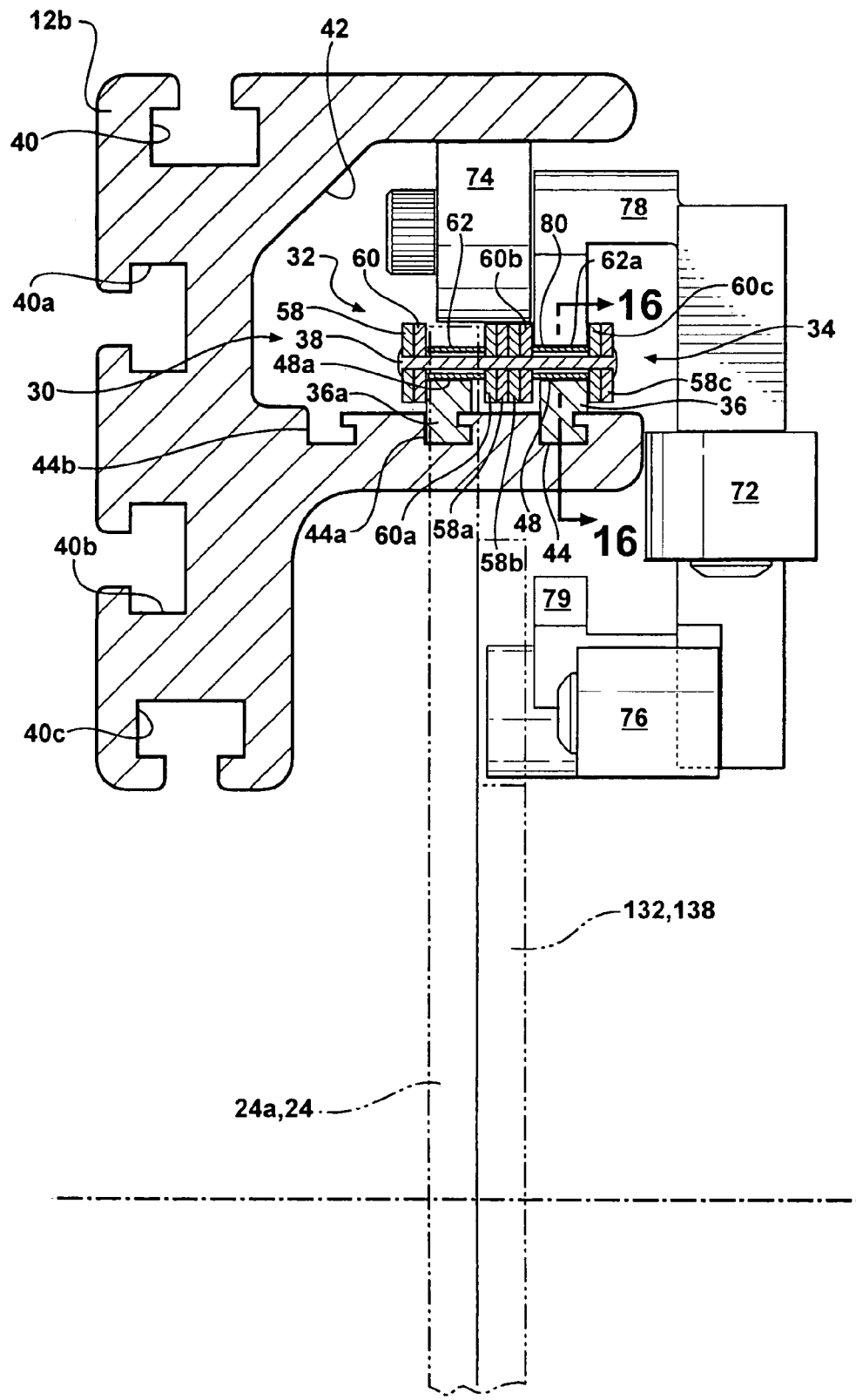
FIG. 6 is a cross-sectional view of a longitudinal support member and a shoe along a top or upper run and left-hand side of the accumulating conveyor with the shoe in a right-side up position.
Figure 7:
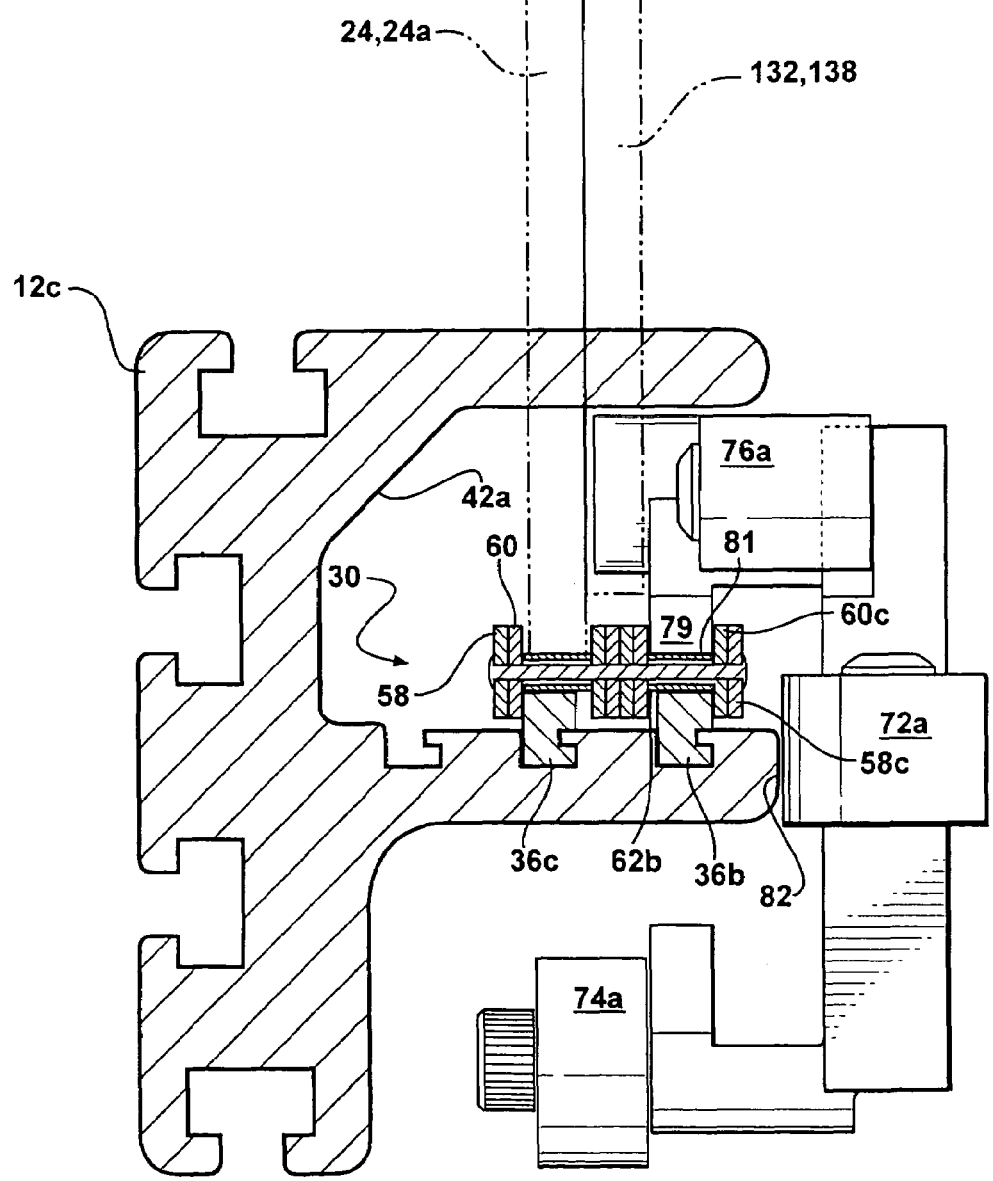
FIG. 7 is a cross-sectional view of a longitudinal support member and a shoe along a bottom or lower run and left-hand side of the accumulating conveyor with the shoe in an upside down position.

The longitudinal members 12 12c can be constructed of steel, aluminum, or some other material having sufficient strength to support the components of the conveyor 10, as well any pieces of work that are being transported by the conveyor system along paths 11a and 11b. The individual longitudinal members 12–12c have substantially similar cross sections. FIGS. 6 and 7 show cross-sectional views of the longitudinal members 12b and 12c, respectively. The longitudinal member 12b includes longitudinally extending channels 40–40c for receiving fasteners used for attaching various components to the longitudinal member. For example one or more of the channels 40–40c can receive fasteners for connecting the longitudinal support member 12b to risers 14b and 14c. Similarly, one or more of the channels 40–40c can also receive fasteners for attaching the longitudinal support member 12b to a transverse support member similar to transverse support member 16. The channels 40–40c may also receive fasteners for connecting the longitudinal support member 12b to an end member, such as end members 20a and 20b, and/or for attaching one or more sensors, fixtures, actuators, workpiece manipulator, and the like, with respect to the longitudinal support member 12b. Each of the other longitudinal members 12, 12a, and 12c, also include channels similar to channels 40–40c of longitudinal member 12b.

Longitudinal support member 12b includes a channel 42, which at least partially enclose the endless chain 30. One or more support channels 44–44b can be defined along a surface of the channel 42. One or more bushing members 36 are individually disposed in one or more of the support channels 44–44b. The bushing members 36 and 36a define support surfaces 48 and 48a for supporting the chain 30.

Referring now to FIGS. 1 and 12–14, the conveyor 10 also includes transverse support members 16 and cross-members, extending between longitudinal members 12a and 12c for example, to support the longitudinal members 12–12c in a spaced relationship with respect to one another. The members 16 and cross-members enhance the strength and rigidity of the conveyor 10. The members 16 and cross-members can also support sensors, actuators, workpiece manipulators and the like. The conveyor 10 also includes end members 20–20c. The end members 20–20c cooperate with the longitudinal support members 12–12c to substantially enclose the endless chains 30 and 30a.

Referring now to FIG. 1, the conveyor 10 also includes axles 22 and 22a. Axle 22 is supported for rotation between the end members 20b and 20c. The axle 22a is mounted for rotation between the end members 20 and 20a. The axles 22 and 22a are mounted to the respective end members 20–20c with bearings. The axles 22 and 22a are disposed substantially centered between the top pair of longitudinal support members 12 and 12b and the pair of bottom longitudinal support members 12a and 12c. The axles 22 and 22a are preferably supported substantially centered with respect to corresponding end members 20–20c.

Referring now to FIGS. 1–5 and 12–14, a sprocket is disposed at each end of each shaft 22–22a for guiding or driving the chains 30 and 30a. For example, a sprocket 24 is disposed at a first end 26 of the shaft 22. A sprocket 24a is disposed at a first end 28 of the shaft 22a. The sprockets 24 and 24a and longitudinal members 12b and 12c support the chain 30 for movement along the path 11. Chain 30a is disposed on an opposite side of the conveyor 10, supported for movement by members 12 and 12a and sprockets 24b and 24c. Sprockets 24a and 24b are keyed with respect to shaft 22a with keys 152 and 152a, respectively. Sprocket 24c are keyed with respect to shaft 22 with key 152b. Sprocket 24 is preferably moveable with respect to shaft 22. The sprocket 24 can be made to be freely moveable with respect to the shaft 22 to accommodate the stack-up tolerances associated with other components of the conveyor 10.

Sprockets 24 and 24c include apertures 154 and 154a, respectively, for aligning the sprockets 24 and 24c, and the associated cams. The cams of the conveyor 10 and the cooperation between the cams and the sprockets will be described in greater detail below. During assembly of the chains 30 and 30a with respect to the support members 12–12c and sprockets 24–24c, sprockets 24 and 24c can be rotated so that the apertures 154 and 154a are disposed a minimum distance from the top or upper run of the conveyor 10. First links of the unassembled chains 30 and 30a can be disposed with respect to teeth of the sprockets 24 and 24c adjacent the apertures 154 and 154a. The chains 30 and 30a are engaged or strung with respect to the other components of the conveyor 10. The last links of the unassembled chains 30 and 30a engage the first links disposed with respect to teeth of the sprockets 24 and 24c, assembling the chains 30 and 30a. In this manner, the cams associated with the sprockets 24 and 24a can be aligned.

Referring now to FIG. 1, the end members 20b and 20c are moveable relative to longitudinal support members 12–12c. Specifically, the conveyor 10 includes actuators individually disposed on opposite sides of the conveyor 10. Actuators include extendable cylinders to move the end members 20b and 20c away from the longitudinal support members 12–12c. The end members 20b and 20c can be moved away from the longitudinal support members 12a–12d to adjust the tautness of the chains 30 and 30a.

Referring now to FIG. 1, the conveyor 10 can include a motor 48 operably associated with a transmission 50 for driving the shaft 22a. A sprocket 52 can be rotated by the motor 48 and transmission 50. A chain 54 engages the sprocket associated with the transmission 50 and a sprocket 56 operably associated with the shaft 22a. The sprocket 56 is disposed on a second end 28a of the shaft 22a exterior of the support members 12 and 12a. The motor 48, transmission 50 and associated sprocket, chain 54 and sprocket 56, cooperate to rotate the shaft 22a, sprockets 24a, 24b, thereby moving the chains 30 and 30a along the paths 11 and 11a.

Referring now to FIG. 6, the chain 30 is preferably at least a double wide chain having an outside portion 32 and an inside portion 34. The portion 32 includes outside plate links 58 and 58a and inside plate links 60 and 60a. The portion 34 includes outside plate links 58b and 58c and inside plate links 60b and 60c. A pin 38 is insertable through apertures formed in plate links 58–58c and 60–60c to rotatingly engage the plate links 58–58c and 60–60c with respect to one another. A bushing 62 can be pierced by or encircle or sheath the pin 38 and be disposed between plate links 60 and 60a. A bushing 62a can be pierced by or encircle or sheath the pin 38 and be disposed between plate links 60b and 60c. The chain 30 can be wider than "double-wide" without departing from scope the invention.

A conveyor 10 can include a triple wide where a length of the conveyor 10 exceeds a predetermined distance to reduce the likelihood of chain elongation. A triple wide chain is assembled similarly as a double wide chain with bushings disposed between inside plate links.

Referring now to FIGS. 1 and 6, during movement of the chain 30 along the portions 19 and 21 of the path 11, teeth of the sprockets 24 and 24a engage the outside portion 32 of the chain 30 between plate links 60 and 60a. The position of the sprockets 24 and 24a relative to the chain 30 and support members 12b and 12c is shown in phantom in FIGS. 6 and 7. The outside portion 32 of the chain 30 engages the bushing members 36a and 36c during movement along portions 15 and 17, respectively, of the path 11. In other words, during movement of the chain 30 along support member 12b, bushing member 36a is positionable in a channel 44a and disposed between plates 60 and 60a of the chain 30. During movement of the chain 30 along support member 12c, bushing member 36c is disposed between plates 60 and 60a.

The inside portion 34 of the chain 30 engages the bushing members 36 and 36b during movement along portions 15a and 17a, respectively, of the path 11a. In other words, during movement of the chain 30 along support member 12b, bushing member 36 is disposed between plates 60b and 60c. During movement of the chain 30 along support member 12c, bushing member 36b is disposed between plates 60b and 60c. In an embodiment of the invention including a triple-wide chain, the conveyor 10 can include a third bushing member positionable in channel 44b for engaging a bushing associated with a third portion of the chain during movement of the chain along the support members 12b and 12c.

The endless chains 30 and 30a can move workpieces along the paths 11 and 11a. Workpieces can be supported by workpiece conveying means such as pallet 64 for movement along the paths 11 and 11a. The pallet 64 can include a plate member 66 for directly and/or indirectly supporting one or more workpieces. For example, workpieces can be disposed on the plate member 66 and moved along the paths 11, 11a. Alternatively, the plate member 66 can also include fixtures, actuators, locators, clamps and the like for indirectly supporting the workpieces.

Figure 8:
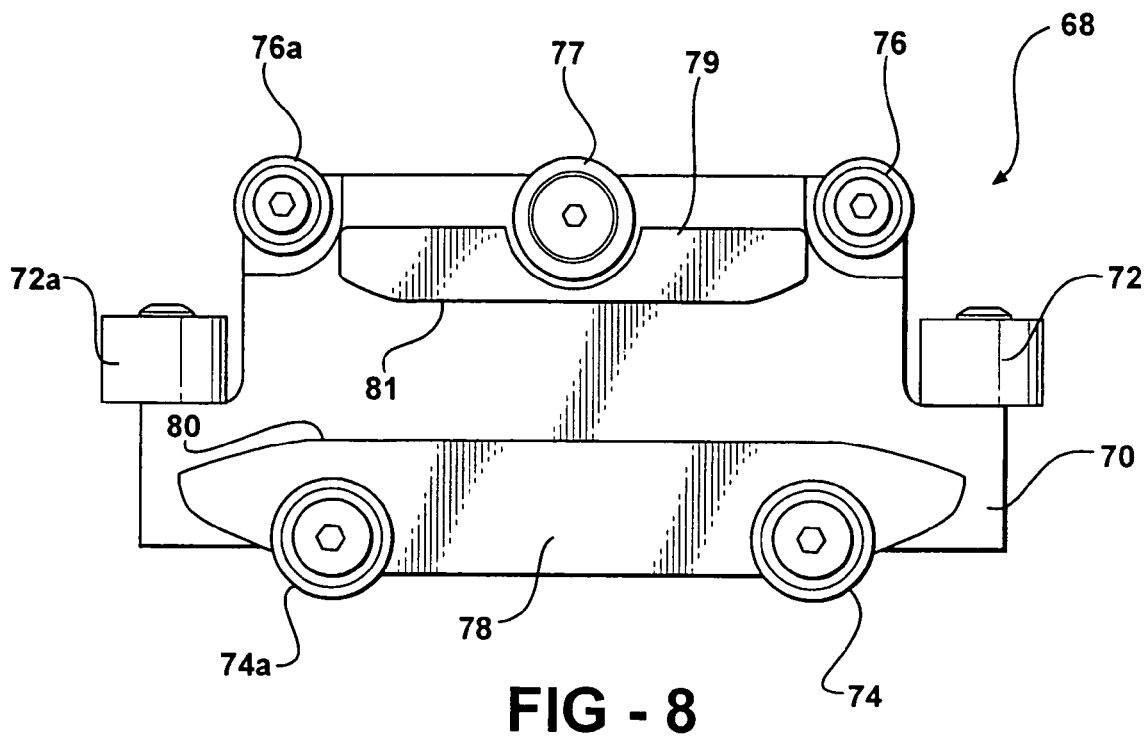
FIG. 8 is a front plan view of a shoe in the upside down position.
Figure 9:
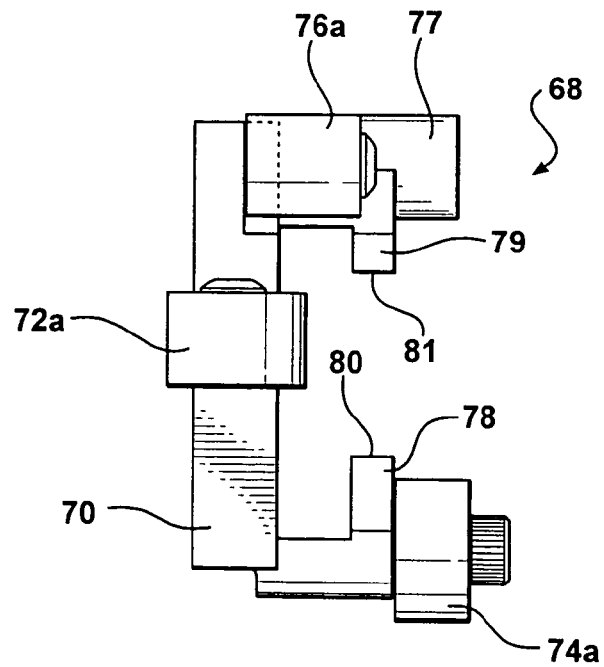
FIG. 9 is a side plan view of a shoe in the upside down position.

Plate members 66 can be engaged on opposite sides by shoes, such as shoe 68 shown in FIGS. 8 and 9. The plate member is releaseably attached to the shoe 68 with bolts, screws, pins and the like. The shoe 68 can be engaged with the chains 30 and 30a without using specialized tools, as will be described in greater detail below. The shoe 68 can engage the endless chains 30 and 30a at any position along the upper and lower runs. In operation, shoe 68 can be engaged with respect to chains 30 and 30a and a plate member 66 can be engaged with each shoe 68 after the shoe 68 has been engaged with respect to the corresponding chain. The cooperation between the shoe 68 and the endless chains 30 and 30a, as well as the cooperation between the plate member 66 and the shoe 68 enhances the efficiency and flexibility of the present invention over the accumulating conveyors of the prior art. Plate members can also include bumpers 148 to reduce the jarring that can occur when two pallets moving along the path strike each other.

The shoe 68 includes a body 70. The plate member 66 is attached to the body 70 with fasteners. The body 70 can be hollow or include one or more apertures for reducing weight of the body 70. The shoe 68 includes transverse rollers 72 and 72a that engage an inside surface of the longitudinal support members, such as surface 82 shown in FIG. 7. The shoe 68 also includes rollers 74 and 74a that can engage the channel 42 of the member 12b as the shoe 68 moves along the portion 15 of the path 11. The shoe 68 also includes rollers 76 and 76a that can engage the channel 42a of the member 12c as the shoe 68 moves along the portion 17 of the path 11. The rollers 74, 74a, 76, and 76a, assist in providing smooth movement of the shoe 68 between the end members 20–20c and the longitudinal support members 12–12c.

The rollers 74 and 74a engage an inwardly-facing arcuate surface defined by the end members 20–20c during movement of the shoe 68 around curved portions 19 and 21. The inwardly facing surface is preferably substantially arcuate and supports the shoe 68 during movement of the shoe 68 along angular portions 19 and 21 of the path 11. For example, cooperation between the rollers 74 and 74a of the shoe 68 and the end member can prevent movement of the shoe 68 and an associated pallet radially outward relative to the angular portions 19 and 21. In addition, the cooperation between the rollers 74 and 74a of the shoe 68 and the end member can enhance engagement of a roller 77 with cams disposed along the paths 11 and 11a. The cooperation between the shoe 68 and the end members is desirable to prevent or limit stress with respect to the endless chains. For example, prior devices have required that the endless chain cooperate to prevent or limit movement of a shoe and an associated pallet at least partially radially outward relative to the angular portions of a path, thereby increasing the amount of stress the endless chain experiences.

The shoe 68 also includes a cam follower roller 77 that engages cams disposed along the paths 11 and 11a. The cooperation of the cam follower roller 77 with the cams will be described in greater detail below. The shoe 68 also includes skid portions 78 and 79. The skid portions 78 and 79 include surfaces 80 and 81 respectively, for engaging the bushing 62a associated with the inside portion 32 of the chain 30. The cooperation of the shoe 68 with the chain 30a is similar to the cooperation between the shoe 68 and the chain 30. As shown in FIG. 6, the surface 80 engages the bushing 62a during movement of the shoe 68 adjacent the longitudinal member 12b. During movement along the top portion 15 of the path 11 of the longitudinal support member 12b, the shoe 68 is in a right-side up position. As shown in FIG. 7, the shoe 68 is movable along the bottom portion 17 of the path 11 adjacent the longitudinal support member 12c in a upside-down position. The surface 81 engages the bushing 62b during movement of the shoe 68 adjacent the longitudinal support member 12c.

Referring now to FIGS. 6 and 16, the cooperation of the shoe 68 with the chain 30, or more specifically the cooperation of the shoe 68 with the bushing 62a, causes the shoe 68 to be moved at a speed that is greater than the speed of the chain 30. The pin 38 translates along the path 11 as the chain 30 moves in the direction 84. The bushing 62a is positioned between the skid 78 and is engageable with the bushing member 36. Specifically, the bushing 62a rotates in the direction 88 about the pin 38 in response to engagement 86 with the bushing member 36. The weight of the skid 78, associated shoe, associated pallet, and associated workpiece (s) enhances the engagement of the bushing 62a with the bushing member 36. Rotation of the bushing 62a moves the skid 78a relative to the pin 38 and chain 30 in the direction 84. As a result, the skid 78 and associated shoe are moved along the upper run 15 and lower run 17 of the path 11 at a higher velocity than the chain 30. Referring now to FIG. 7, the bushing 62b can engage the surface 81 of the skid 79 during movement of the shoe 68 and move the shoe 68 along the portion 17 of the path 11 at a higher velocity than the chain 30.

The engagement of the bushing 62a and the skid 78 is partially frictional such that the skid 78 can be moved by rotation of the bushing 62a and also the skid 78 can be stopped at any position along the path 11a adjacent the longitudinal support member 12c while the chain 30 continues to move. The surface 80 of the skid 78 is long enough to concurrently engage a plurality of bushings similar to bushing 62a.

Figure 11:
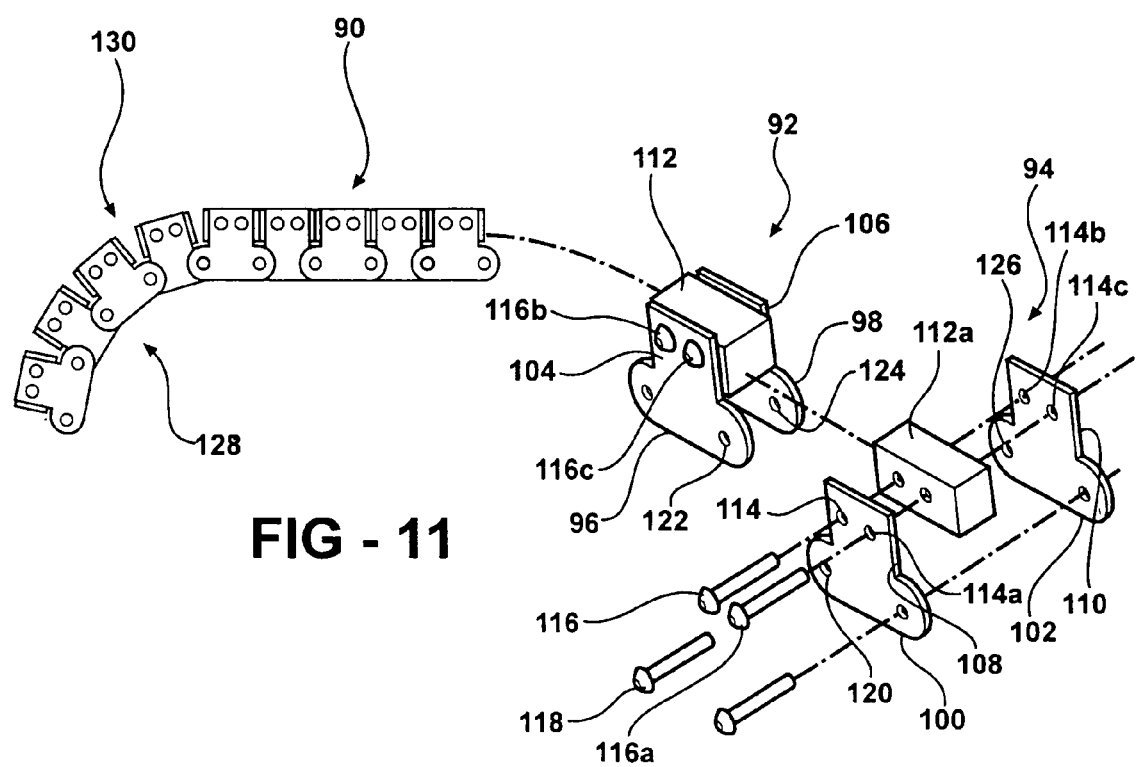
FIG. 11 is a partial side plan view, partial isometric view, and partial exploded view of a second embodiment of a chain for engaging two pallets with respect to one another.

Referring now to FIGS. 1 and 11, the invention can also include an anti-back flex chain 90 for operably associating two or more pallets 64 with respect to one another. Chain 90 can include one or more roller links 92 and one or more connecting links 94. Each of the roller links 92 and connecting links 94 can be defined by a pair of plates. For example, the roller link 92 can be defined by first and second inside plates 96 and 98. The connecting link 94 can be defined by first and second pin link plates 100 and 102.

Figure 10:
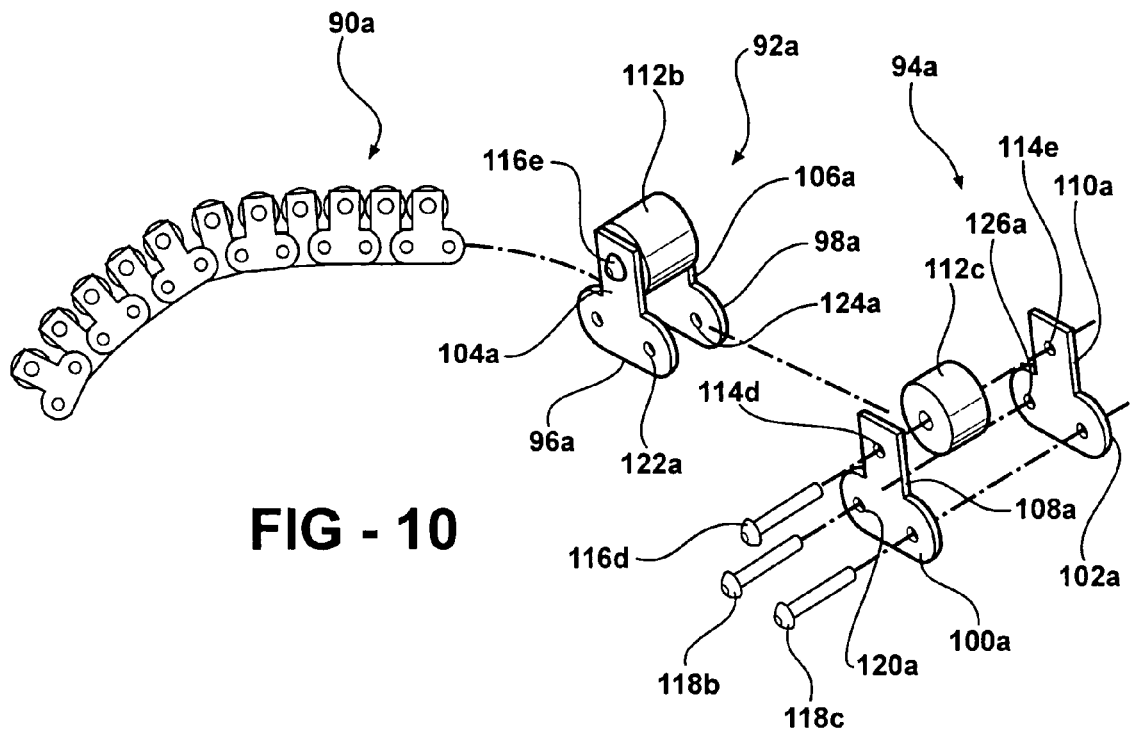
FIG. 10 is a partial side plan view, partial isometric view, and partial exploded view of a first embodiment of a chain for engaging two pallets with respect to one another.

Referring now to FIG. 10, the chain 90a of the invention can include one or more roller links 92a and one or more connecting links 94a. Each of the roller links 92a and connecting links 94a can be defined by a pair of plates. For example, the roller link 92a can be defined by first and second inside plates 96a and 98a. The connecting link 94a can be defined by first and second pin link plates 100a and 102a.

Referring now to FIG. 11, each of the plates defining the roller links 92 and connecting links 94 includes straight link plate extensions individually extending the plates. For example, the plates 96 and 98 include extensions 104 and 106, respectively. The plates 100 and 102 include extensions 108 and 110, respectively. Referring now to FIG. 10, each of the plates defining the roller links 92a and connecting links 94a includes straight link plate extensions individually extending the plates. For example, the plates 96a and 98a include extensions 104a and 106a, respectively. The plates 100a and 102a include extensions 108a and 110a.

Referring now to FIG. 11, the chain 90 also includes at least one member positionable between the first and second extensions. The member 112 is positionable between extensions 104 and 106. The member 112a is positionable between extensions 108 and 110. The members 112 and 112a can be substantially a box, or box-like. The member 112 and 112a can be substantially hollow or substantially solid. Referring now to FIG. 10, the at least one member 112b is positionable between the first and second extensions 104a and 106a. The member 112c is positionable between extensions 108a and 110a. The members 112b and 112c are substantially cylindrical.

Referring now to FIG. 11, the chain 90 can also include at least one aperture defined in each extension and a pin insertable in the apertures defined in each of the extensions and through the member to engage the member with respect to the first and second plates. For example, the extension 108 can define apertures 114 and 114a, the extension 110 can define apertures 114b and 114c. Pin 116 is insertable with respect to the apertures 114 and 114b and through the member 112a to engage the member 112a with respect to the plates 100 and 102. Pin 116a is insertable with respect to the apertures 114a and 114c and through the member 112a to engage the member 112a with respect to the plates 100 and 102. Pins 116b and 116c are shown assembled or inserted with respect to apertures (not shown) defined by extensions 104 and 106 and through the member 112 to engage the member 112 with respect to the plates 96 and 98.

Referring now to FIG. 10, the extension 108a define an aperture 114d and the extension 110a define an aperture 114e. A pin 116d is insertable with respect to the apertures 114d and 114e and through the member 112c to engage the member 112c with respect to the plates 108a and 110a. A pin 116e is shown assembled or inserted with respect to apertures (not shown) defined by extensions 104a and 106a to engage member 112b with respect to plates 96a and 98a.

Referring now to FIG. 11, roller link 92 engage the connecting link 94 with pin 118. Pin 118a engages the connecting link 94 with an opposing roller link (not shown). Pin 118 is insertable with respect to apertures 120, 122, 124 and 126 to rotatingly engage the roller link 92 with respect to the connecting link 94. Pin 118 engages the plate 96 with respect to the plate 100 and engages the plate 98 with respect to the plate 102.

Referring now to FIG. 10, pin 118b is insertable with respect to apertures 120a, 122a, 124a and 126a to rotatingly engage the roller link 92a with respect to the connecting link 94a. Pin 118c engages the connecting link 94a with an opposing roller link (not shown). Adjacent links can also be rotatingly associated with respect to one another with bushings and rollers (not shown). The pins 118–118c are maintained in a desired position with cotter pins or any other structure known in the chain art.

Referring now to FIG. 11, the chain 90 is operable to flex or bend in one direction. Generally, chains are bendable about an axis perpendicular to a longitudinal axis of the chain. A standard, or typical transmission roller chain can bend about an bending axis disposed on either of two sides of the longitudinal axis. The chain 90 is operable to bend about a bending axis disposed on one side of the longitudinal axis. For example, the chain 90 can bend about an axis disposed adjacent a first side 128 of the chain 90 and can become a rigid, substantially straight structural member when forces tend to induce bending about a second side 130 of the chain 90. When the chain 90 bends about an axis disposed adjacent a first side 128 of the chain 90, roller link 92 and connecting link 94 rotate with respect to one another about the pin 118, extensions 104 and 108 rotate away from one another, extensions 106 and 110 rotate away from one another, and members 112 and 112a move away from one another. When forces are applied to the chain 90 such that the chain 90 is induced to straighten from a bent orientation, roller link 92 and connecting link 94 rotate with respect to one another about the pin 118, extensions 104 and 108 rotate toward one another, extensions 106 and 110 rotate toward one another, and members 112 and 112a move toward one another. Bending of the chain 90 about an axis adjacent the second side 52 is limited by engagement of the member 112 and the member 112a.

Referring now to FIG. 10, the substantially cylindrical members 112b and 112c can engage as the chain 90a is straightened. Particles and debris disposed on or between the members 112b and 112c can be moved or directed or shifted as the members 112b and 112c engage. Specifically, the members 112b and 112c can rotate with respect to one another, rotation of the members 112b and 112c operable to induce movement of particles and debris.

Referring now to FIG. 11, the box-like members 112 and 112a can engage as the chain 90 is straightened. Particles and debris disposed on or between the members 112 and 112a can be compressed or crushed between the members 112 and 112a as the members 112 and 112a engage.

The conveyor 10 includes four cams individually disposed at the ends of the axles 22 and 22a. The cams associated with axle 22a at the end of the conveyor 10 engage the cam follower rollers of the shoes to move the pallets from the upper runs, or top portions of the paths 11 and 11a, to lower runs, or bottom portions of the paths 11 and 11a. The cams associated with axle 22 at the beginning of the conveyor 10 engage the cam follower rollers of the shoes to move the pallets from bottom portions of the paths 11 and 11a to top the portions of the paths 11 and 11a. The cams control movement of the shoes disposed at opposite ends of the plate member, the shoes and plate member defining a pallet, to minimize shifting or rotation of the pallet with respect to an axis 156 during movement of the pallet along the angular portions of the conveyor 10. The cams include three receiving portions that are substantially aligned along a longitudinal axis of the corresponding axle to receive cam follower rollers of shoes disposed at opposite ends of the plate member. Cam surfaces are disposed between receiving portions to control movement of the shoe prior to movement around the angular portions of the conveyor. Each cam is configured differently with respect to the other three cams. Therefore, the movement of each shoe adjacent to the end portions of the conveyor is different.

Two of the cams can be designated as primary cams and two of the cams can be designated as secondary cams. A primary cam and a secondary cam can be mounted with respect to each axle. The primary cams are engageable with the cam follower roller of a shoe disposed on a first side of a plate member before the secondary cam engages a shoe on a second side of the plate member. The primary cams are preferably disposed at opposite corners of the conveyor with respect to one another.

Referring now to FIGS. 1–5, a cam 132 is designated as a secondary cam and is disposed at the end 26 of the axle 22, adjacent a rear left corner of the accumulating conveyor 10. Cam 134 is designated a primary cam and is disposed at the end 28 of the axle 22a, adjacent to a front left corner of the accumulating conveyor 10. Cam 136 is designated as a secondary cam and is disposed adjacent end 28a of the axle 22a, adjacent a front right corner of the accumulating conveyor 10. Cam 138 is designated a primary cam and is disposed at the end 26a of the axle 22, adjacent a rear right corner of the accumulating conveyor 10. Each of the cams 132, 134, 136 and 138 is configured differently with respect to one another.

Each of the cams 132, 134, 136 and 138 can be formed in three substantially similar sections. Each of the cams 132, 134, 136 and 138 include a plurality of cam follower receiving portions. For example, cam 132 includes receiving portions 150–150b. Cam 134 includes receiving portions 150c–150e. Cam 136 includes receiving portions 150f–150h. Cam 138 includes receiving portions 150i–150k.

The cams also include cam surfaces for controlling movement of the shoes. Cam 132 includes surfaces 160–160b. Cam 134 includes surfaces 160c–160e. Cam 136 includes surfaces 160f–160h. Cam 132 includes surfaces 160i–160k. The cooperation between the cam follower rollers and the cam surfaces will be described in greater detail below.

Each cam 132, 134, 136 and 138 are attached to an adjacent sprocket with bolts. Apertures defined in the sprockets for receiving bolts are spaced in a predetermined relationship with respect to the aligning apertures 154 and 154a. Cams 134 and 136 are disposed at opposite ends of the shaft 22a and are engaged with sprockets 24a and 24b, respectively, with bolts or other fasteners. Sprockets 24a and 24b are immovably associated with the shaft 22a with keys 152 and 152a, respectively. The keys 152 and 152a align the sprockets such that the receiving portions 150c–150e of the cam 134 are aligned along a longitudinal axis of the shaft 22a with the receiving portions 150f–150h of the cam 136. For example, the receiving portion 150f can be aligned with the receiving portion 150c across the shaft 22a. The alignment of the receiving portions increases the likelihood that the cam follower rollers of two shoes of a pallet moving along the conveyor 10, a first shoe moving along the path 11 and a second shoe moving along the path 11a, concurrently engage corresponding receiving portions. The receiving portions 150c–150h are formed to cradle a cam follower roller and prevent uncontrolled movement of a pallet from the portions 15 and 15a of the paths 11 and 11a to the portions 17 and 17a.

Figure 2:
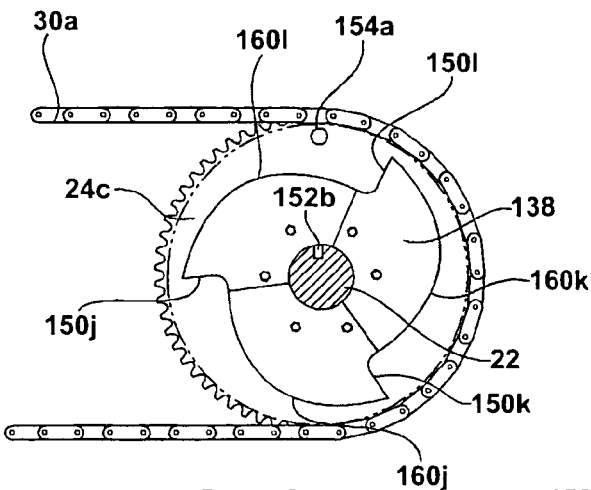
FIG. 2 is a partial cross-sectional view showing a cam of the accumulating conveyor positionable at the beginning of an upper run of the accumulating conveyor on the right-hand side.
Figure 4:
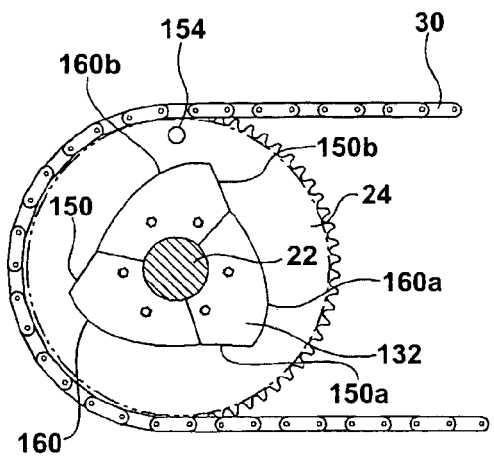
FIG. 4 is a partial cross-sectional view showing a cam of the accumulating conveyor positionable at the beginning of the upper run of the accumulating conveyor on the left-hand side.

Referring now to FIGS. 2 and 4, cams 132 and 138 are disposed at opposite ends of the shaft 22 and are engaged with sprockets 24 and 24c, respectively, with bolts or other fasteners. Sprocket 24c is immovably associated with the shaft 22 with key 152b. Sprocket 24 is moveable relative to the shaft 22. The sprockets 24 and 24c include aligning apertures 154 and 154a for aligning the sprockets such that the receiving portions 150–150b of the cam 132 are substantially aligned along the longitudinal axis of the shaft 22 with the receiving portions 150i–150k of the cam 138. For example, the receiving portion 150 can be aligned with the receiving portion 150i across the shaft 22. The alignment of the receiving portions increases the likelihood that the cam follower rollers of two shoes of a pallet moving along the conveyor 10, a first shoe moving along the path 11 and a second shoe moving along the path 11a, concurrently engage the corresponding receiving portions. The receiving portions 150–150b and 150i–150k are formed to lift cam follower rollers, associated shoes, and an associated pallet from the portions 17 and 17a of the paths 11 and 11a to the portions 15 and 15a.

Figure 12:
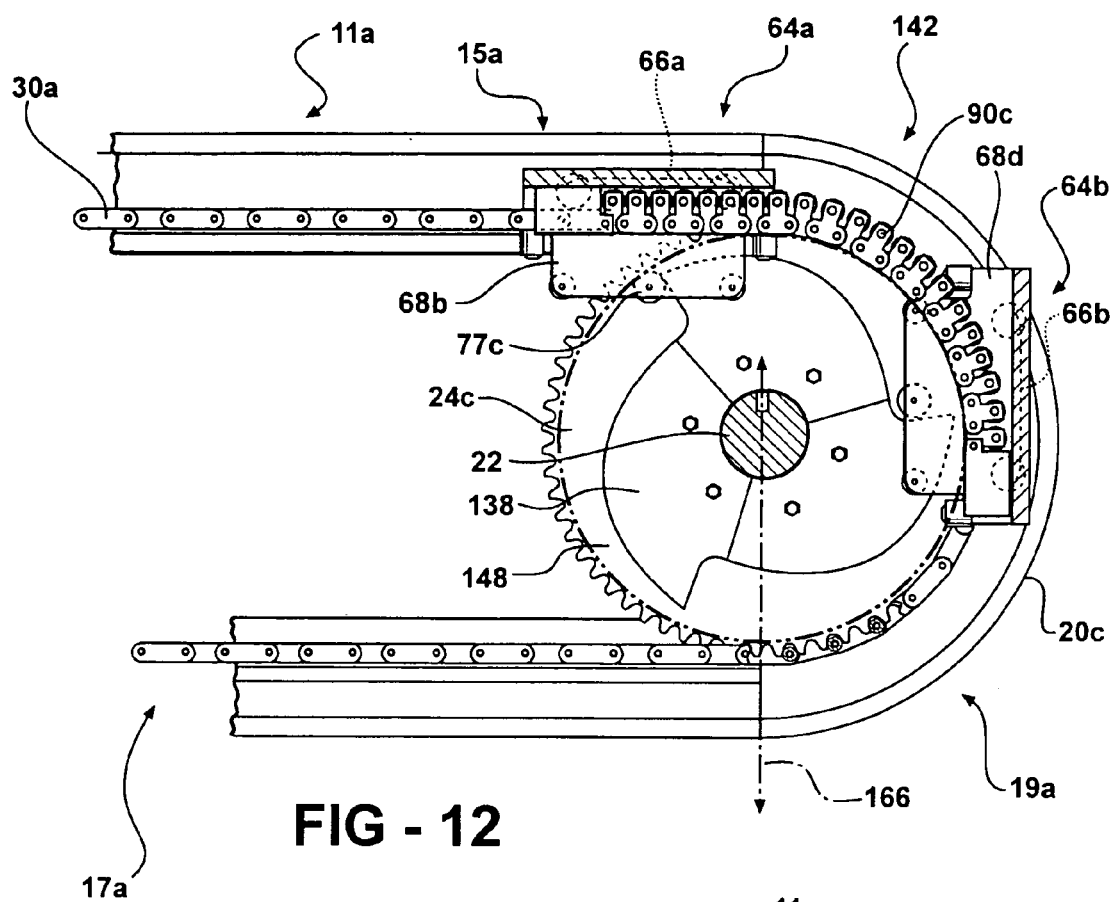
FIG. 12 is a partial cross-sectional view of a beginning, right-hand portion of the accumulating conveyor.
Figure 14:
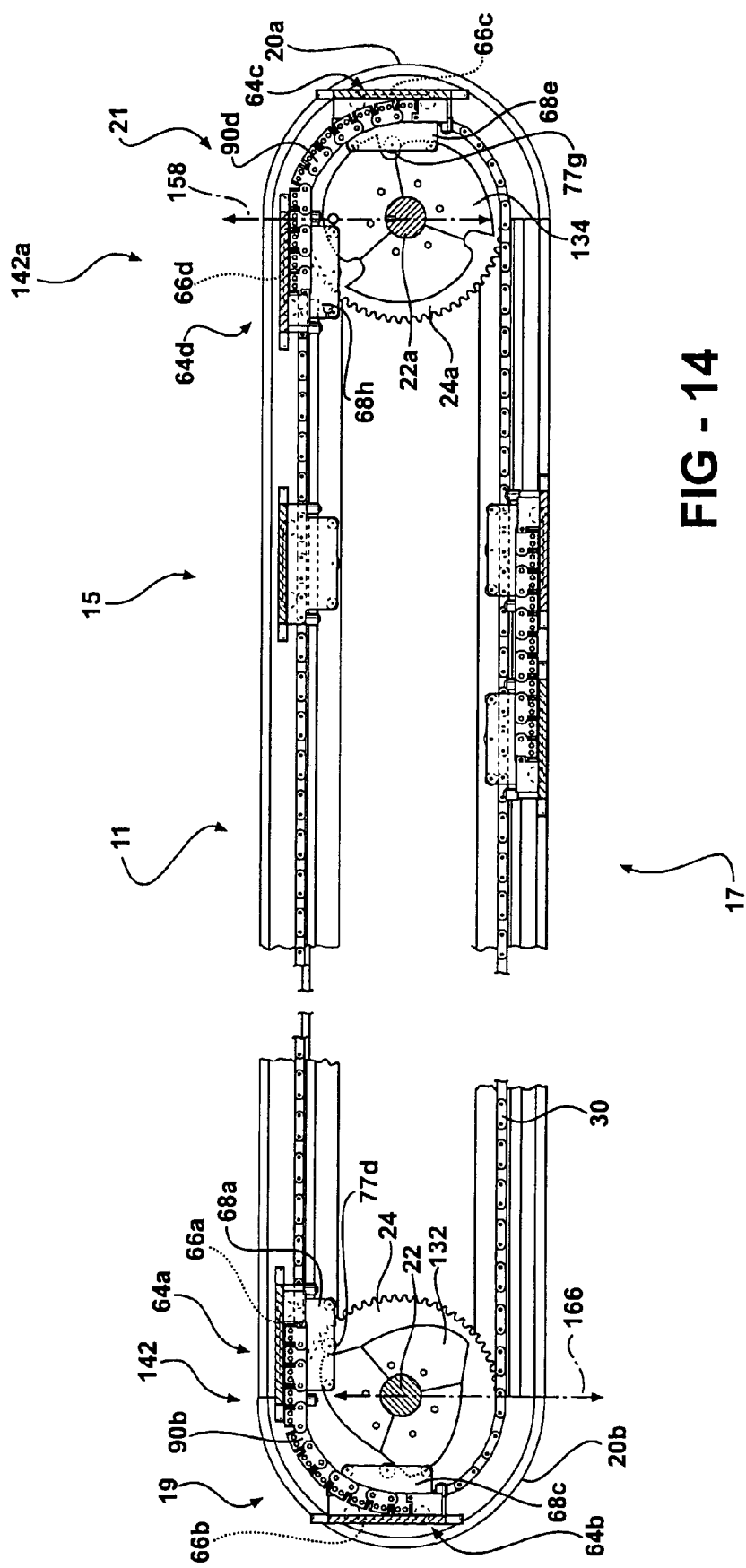
FIG. 14 is a broken cross-sectional view of a left-hand side of the accumulating conveyor.

Referring now to FIGS. 12 and 14, a pallet assembly 142 is moveable along the bottom portions or return portions 17 and 17a of the paths 11 and 11a, and is movable from the bottom portions 17 and 17a to the top portions 15 and 15a with cams 138 and 132. The pallet assembly 142 can include pallets 64a and 64b operably associated with respect to one another with chains 90b and 90c. The centerline of the pallet 64a can be positioned approximately 360 mm from the centerline of the pallet 64b. Pallet 64a includes shoes 68a and 68b disposed at opposite ends of plate member 66a. Pallet 64b includes shoes 68c and 68d disposed at opposite ends of plate member 66b.

The pallet assembly 142 moves along the return portions 17 and 17a of the paths 11 and 11a to the first angular portions 19 and 19a adjacent the rear or beginning of the accumulating conveyor 10. The cams 132 and 138 rotate about the axle 22 as the chains 30 and 30a move along the paths 11 and 11a, respectively. The shoes 68a and 68b are movable to a position adjacent the sprockets 24 and 24c, respectively. The cam follower rollers 77c and 77d of the shoes 68b and 68a, respectively, may engage one of the receiving portions of the cams 138 and 132 and be moved around angular portions 19a and 19. The receiving portions of the cams 138 and 132 are aligned along the longitudinal axis of the axle 22 to minimize the possibility of the pallet rotating about an axis similar to axis 156. The shoes 68a and 68b can be concurrently received by receiving portions of the cams 132 and 138. The receiving portions 150–150b and 150i–150k, of the cams 132 and 138, respectively, control movement of the corresponding cam follower rollers in a first angular direction, the direction opposite the rotation of the cams 132 and 138. Gravity prevents movement of the cam follower rollers in a second angular direction, the direction of rotation of the cams 132 and 138.

Alternatively, the cam follower roller 77c of the shoe 68b can be received by one of the receiving portions 150i–150k of the cam 138, the pallet 64a can be moved a distance around the angular portions 19 and 19a, and the cam follower roller 77d of the shoe 68a can be received by one of the receiving portions 160–160b of the cam 132 at a position along the angular portion 19a.

Alternatively, the cam follower roller 77c of the shoe 68b can engage one of the cam surfaces 160i–160k of the cam 138 when the shoe 68b moves to the end of the return portion 17a. The cam follower rollers 77c and 77d are received by receiving portions of the cams 138 and 132 substantially at an axis 166. Movement of the chains 30 and 30a, along paths 11 and 11a, tend to move the shoes 68a and 68b along portions 17 and 17a to the axis 166. The cam surfaces 160–160b, 160i–160k, of the cams 132 and 138, respectively, control movement the cam follower rollers 77d and 77c by limiting the movement of the cam follower rollers 77d and 77c to the axis 166. In other words, the cooperation between the cam follower rollers 77d and 77c and the cam surfaces 160–160b, 160i–160k, of the cams 132 and 138, respectively, as well as the cooperation between the shoes 68b and 68a and the chains 30a and 30, define a rate at which the shoes 68b and 68a move to the axis 166. The cam surfaces 160–160b, 160i–160k, of the cams 132 and 138, respectively, are different, so the rates at which the shoes 68a and 68b move to the axis 166 are different.

At the end of the return portions 17 and 17a, the pallet assembly 142 can partially float with respect to the chains 30 and 30a while the chains 30 and 30a continue to move until the cam follower rollers 77c and 77d are received by receiving portions of the cams 138 and 132. It has been observed that the cooperation between the cam surfaces 160–160b of the cam 132 and the cam follower 77d, as well as the cooperation between the cam surfaces 160i–160k of the cam 138 and the cam follower 77c, produce a shimmy-like motion in the pallet 64a. Specifically, the pallet 64a can slightly rotate in opposite directions about an axis similar to axis 156. It is believed the slight back-and-forth rotation helps align a transverse axis 164 of the pallet 64a to be substantially perpendicular to a longitudinal axis of the conveyor 10. The slight back-and-forth rotation can diminish in intensity as the cams rotate from an orientation in which the cam follower rollers are engaging cam surfaces, to an orientation in which the cam follower rollers are received in the receiving portions.

The first pallet 64a and the second pallet 64b can be spaced apart with respect to one another a distance determined to enhance the likelihood that cam follower rollers associated with the shoes 68c and 68d are received by receiving portions of the cams 132 and 138 without engaging cam surfaces of the cams 132 and 138. For example, if the cam follower roller 77c, of the shoe 68b and pallet 64a, is received by receiving portion 150i, the pallet 64b can be spaced from the pallet 64a such that the cam follower roller 77e of the shoe 68d is received by the receiving portion 150k and does not engage cam surface 160k. Likewise, if the cam follower roller 77d, of the shoe 68a and pallet 64a, is received by receiving portion 150b, the pallet 64b can be spaced from the pallet 64a such that the cam follower roller 77f of the shoe 68c is received by the receiving portion 150a and does not engage cam surface 160a. The chains 90b and 90c can be supported with circular bushings, such as bushing 148 (shown in phantom), disposed adjacent the sprockets and cams.

Figure 3:
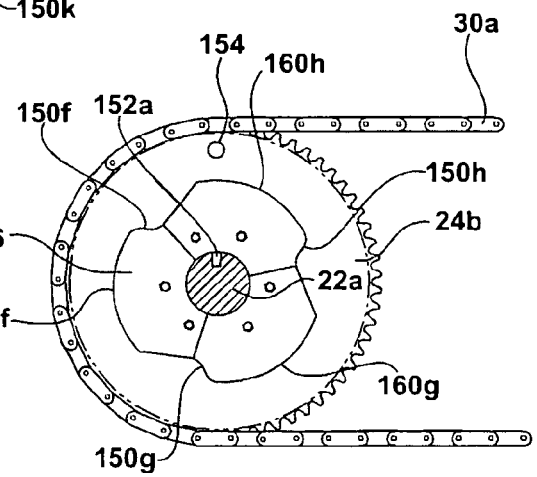
FIG. 3 is a partial cross-sectional view showing a cam of the accumulating conveyor positionable at the end of the upper run of the accumulating conveyor on the right-hand side.
Figure 5:
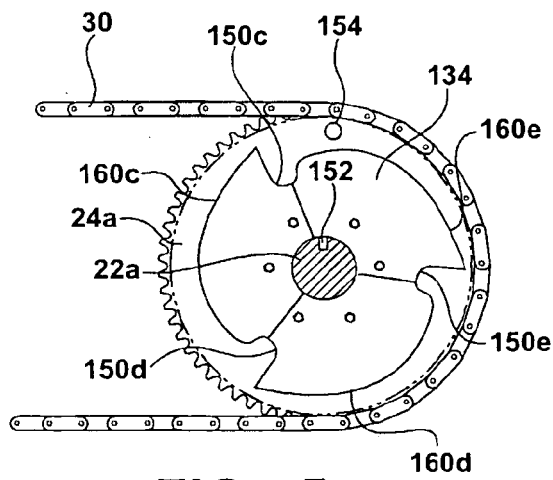
FIG. 5 is a partial cross-sectional view showing a cam of the accumulating conveyor positionable at the end of the upper run of the accumulating conveyor on the left-hand side.

Referring now to FIGS. 3 and 5, cams 134 and 136 are disposed at opposite ends of the shaft 22a and are engaged with sprockets 24a and 24b, respectively, with bolts or other fasteners. Sprockets 24a and 24b are immovably associated with the shaft 22a with key portions 152 and 152a, respectively. The receiving portions 150c–150e of the cam 134 are preferably substantially aligned along the longitudinal axis of the shaft 22a with the receiving portions 150f–150h of the cam 136 with the key portions 152 and 152a. For example, the receiving portion 150d can be aligned with the receiving portion 150f across the shaft 22a. The alignment of the receiving portions increases the likelihood the cam follower rollers of two shoes of a pallet moving along the conveyor 10, a first shoe moving along the path 11 and a second shoe moving along the path 11a, concurrently engage the corresponding receiving portions. The receiving portions 150c–150e and 150f–150h are formed to cradle cam follower rollers, associated shoes, and an associated pallet for controlled movement from the portions 15 and 15a of the paths 11 and 11a to the portions 17 and 17a.

Figure 13:
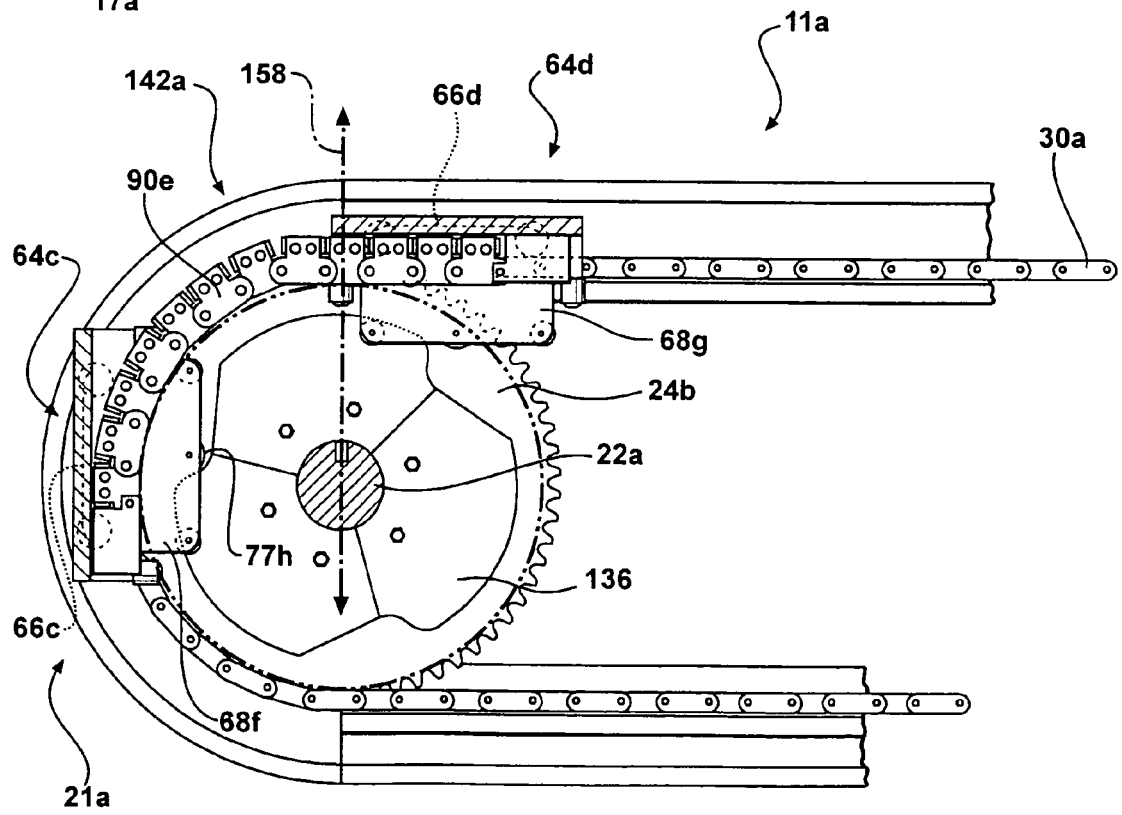
FIG. 13 is a partial cross-sectional view of a ending, right-hand portion of the accumulating conveyor.

Referring now to FIGS. 13 and 14, a pallet assembly 142a is moveable along top portions 15 and 15a of the paths 11 and 11a, and is also moveable from the top portion 15 and 15a to the bottom portions 17 and 17a with cams 134 and 136. The pallet assembly 142a can include pallets 64c and 64d operably associated with respect to one another with chains 90d and 90e. The centerline of the pallet 64c can be positioned approximately 360 mm from the centerline of the pallet 64d. Pallet 64c includes shoes 68e and 68f disposed on opposite ends of plate member 66c. Pallet 64d includes shoes 68g and 68h disposed at opposite ends of plate member 66d.

The pallet assembly 142a is moveable along the top portions 15 and 15a of the paths 11 and 11a to the second angular portions 21 and 21a adjacent the front or end of the accumulating conveyor 10. The cams 134 and 136 rotate about the axle 22a as the chains 30 and 30a move along the paths 11 and 11a, respectively. The shoes 68e and 68f move to be adjacent to the sprockets 24a and 24b, respectively.

The cam follower rollers 77g and 77h of the shoes 68e and 68f, respectively, can engage one of the receiving portions of the cams 134 and 136 and be moved around angular portions 21 and 21a. The receiving portions of the cams 134 and 136 are aligned along the longitudinal axis of the axle 22a and minimize the possibility that the pallet will rotate about an axis similar to axis 156. The shoes 68e and 68f can be concurrently received by receiving portions of the cams 134 and 136. The receiving portions 150c–150e and 150f–150h, of the cams 134 and 136, respectively, control movement of the corresponding cam follower rollers.

Alternatively, the cam follower roller 77g of the shoe 68e can engage one of the cam surfaces 160c–160e of the cam 134 when the shoe 68e moves to the end of the top portion 15. The cam follower rollers 77g and 77h are received by receiving portions of the cams 134 and 136 substantially at an axis 158. Movement of the chains 30 and 30a, along paths 11 and 11a, tend to move the shoes 68e and 68f along portions 15 and 15a to the axis 158. The cam surfaces 160c–160e and 160f–160h, of the cams 134 and 136, respectively, control movement the cam follower rollers 77g and 77h by limiting the movement of the cam follower rollers 77g and 77h to the axis 158. In other words, the cooperation between the cam follower rollers 77g and 77h and the cam surfaces 160c–160e and 160f–160h, of the cams 134 and 136, respectively, as well as the cooperation between the shoes 68e and 68f and the chains 30a and 30, define a rate at which the shoes 68e and 68f move to the axis 158. The cam surfaces 160c–160e and 160f–160h, of the cams 134 and 136, respectively, are different, so the rates at which the shoes 68e and 68f move to the axis 158 are different.

At the end of the top portions 15 and 15a, the pallet assembly 142a can partially float with respect to the chains 30 and 30a while the chains 30 and 30a continue to move until the cam follower rollers 77g and 77h are received by receiving portions of the cams 134 and 136. It has been observed that the cooperation between the cam surfaces 160c–160e of the cam 134 and the cam follower 77g, as well as the cooperation between the cam surfaces 160f–160h of the cam 136 and the cam follower 77h, produce a shimmy-like motion in the pallet 64c. Specifically, the pallet 64c can slightly rotate in opposite directions about an axis similar to axis 156. It is believed that the slight back-and-forth rotation helps align a transverse axis 164 of the pallet 64c to be substantially perpendicular to a longitudinal axis of the conveyor 10. The slight back-and-forth rotation can diminish in intensity as the cams rotate from an orientation in which the cam follower rollers are engaging cam surfaces, to an orientation in which the cam follower rollers are received in the receiving portions.

The first pallet 64c and the second pallet 64d can be spaced apart with respect to one another a distance determined to enhance the likelihood that cam follower rollers associated with the shoes 68g and 68h are received by receiving portions of the cams 134 and 136 without engaging cam surfaces of the cams 134 and 136. For example, if the cam follower roller 77g, of the shoe 68e and pallet 64c, is received by receiving portion 150c, the pallet 64d can be spaced from the pallet 64c such that the cam follower roller 77i of the shoe 68h is received by the receiving portion 150d and does not engage cam surface 160c. Likewise, if the cam follower roller 77h, of the shoe 68f and pallet 64c, is received by receiving portion 150h, the pallet 64d can be spaced from the pallet 64c such that the cam follower roller 77j of the shoe 68g is received by the receiving portion 150g and does not engage cam surface 160g.

The shoes according to the invention are distinct from the plate member and enhance the flexibility of the conveyor. Specifically, the shoe can remain positioned with respect to a chain while a plate member is replaced. A plurality of differently configured plates can be maintained, each plate for supporting one configuration of workpiece to be moved along the path. Thus, several different configurations of workpieces can be moved along the path defined by the conveyor 10 without removing the shoes with respect to the chains 30 and 30a. The shoes can also be moveable about the chain without being engaged with respect to a plate member. This feature can be desirable for testing the conveyor and for developing alternative cam profiles. The shoes can also include a dedicated cam follower roller. Specifically, the cam follower roller does not engage the chains 30 and 30a. This feature can be desirable to simplify the cams and sprockets. Specifically, the shoes do not require a distinct stop or projection to prevent the cam follower roller from engaging the chains 30 and 30a at the angular portions of the path. The cooperation between a skid of the shoe and bushing member associated with the longitudinal members enhances movement of the shoe in that the shoe can move relative to a corresponding chain. Unlike previous devices, the structure disclosed by the present invention does not require special construction of the chain. Specifically, both the bushing member and the skid are sized to be disposed between the inner links of chain.

The cams of the present invention are differently configured with respect to one another and reduce the likelihood that a pallet will bind during movement between the upper and lower runs of the accumulating conveyor. The configuration of the cams of the present invention accommodates slight misalignments in pallets, with respect to the longitudinal axis of the conveyor, by individually controlling the speed of each shoe of a pallet and inducing slight shimmying.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An accumulating conveyor system having a beginning and an end, the conveyor system comprising:
   an upper support member having an upper horizontal leg and a lower horizontal leg positioned substantially parallel to the upper horizontal leg;
   a lower support member having an upper horizontal leg and a lower horizontal leg positioned substantially parallel to the upper horizontal leg;
   an endless transport member supported along the lower horizontal leg of the upper support member and the lower horizontal leg of the lower support member;
   a shoe engageable with the endless transport member for movement along the upper support member and lower support member;
   first means for transporting the shoe from the lower support member to the upper support member at the beginning of the conveyor system;
   second means for transporting the shoe from the upper support member to the lower support member at the end of the conveyor system; and
   wherein the shoe includes a body, a first skid attached to the body and having a substantially flat bearing surface engageable with the endless transport member when the shoe is positioned adjacent the upper support member, a second skid attached to the body and having a substantially flat bearing surface engageable with the endless transport member when the shoe is positioned adjacent the lower support member, and at least one transverse roller attached to the body of the shoe and positioned along a plane that passes between the bearing surface of the first skid and the bearing surface of the second skid.

2. The conveyor system of claim 1, wherein the at least one transverse roller is rotatable about an axis aligned substantially perpendicular to at least one of the bearing surface of the first skid and the bearing surface of the second skid.

3. The conveyor system of claim 1, wherein the bearing surface of the first skid is aligned substantially parallel to the bearing surface of the second skid.

4. The conveyor system of claim 1, wherein the transverse roller comprises an outer circumferential surface engageable with the upper support member when the shoe is positioned adjacent the upper support member, and engageable with the lower support member when the shoe is positioned adjacent the lower support member.

5. The conveyor system of claim 1, wherein an outer circumferential surface of the transverse roller is engageable with an end surface of the lower horizontal leg of the upper support member when the shoe is positioned adjacent the upper support member, and is engageable with an end surface of the lower horizontal leg of the lower support member when the shoe is positioned adjacent the lower support member.

6. The conveyor system of claim 1, wherein the rotational axis of the at least one transverse roller is positioned inboard of the bearing surface of the first skid and the bearing surface of the second skid.

7. The conveyor system of claim 1, wherein the upper support member includes an inlet end and an exit end, the lower support member includes and inlet end and an exit end, and wherein the conveyor system further comprises a first end member having an inlet end positioned adjacent the exit end of the lower support member and an exit end positioned adjacent the inlet end of the upper support member, and a second end member having an inlet end positioned adjacent the exit end of the upper support member and an exit end positioned adjacent the inlet end of the lower support member.

8. The conveyor system of claim 7, wherein the shoe further comprises at least one roller rotatably attached to the body of the shoe such that at least a portion of an outer circumferential edge surface of the at least one roller is disposed above the body of the shoe when the shoe is positioned in an upright position, and wherein the first end member comprises an arcuate surface that is engageable with at least one of the at least one roller for guiding the shoe between the end of the lower support member to the entrance of the upper support member.

9. The conveyor system of claim 7, wherein the shoe further comprises at least one roller rotatably attached to the body of the shoe such that at least a portion of an outer circumferential edge surface of the at least one roller is disposed above the body of the shoe when the shoe is positioned in an upright position, and wherein the second end member comprises an arcuate surface engageable with at least one of the at least one roller for guiding the shoe from the end of the upper support member to the entrance of the lower support member.

10. The conveyor system of claim 1, wherein the first transporting means comprises a primary cam having an outer circumferential edge defining at least one receiving portion, the primary cam being rotatable about a rotational axis aligned substantially perpendicular to a plane of the primary cam and passing through a geometric center of the primary cam.

11. The conveyor system of claim 10, wherein the shoe further comprises a cam follower attached to the body of the shoe at a position located below the bearing surface of the first skid and the bearing surface of the second skid when the shoe is positioned in an upright position, the cam follower engageable with the receiving portion of the primary cam, whereupon rotation of the primary cam moves the shoe from the exit of the lower support member to the entrance of the upper support member.

12. The conveyor system of claim 10, wherein the first transporting means comprises a secondary cam having an outer circumferential edge defining at least one receiving portion, the secondary cam being rotatable about a rotational axis aligned substantially perpendicular to a plane of the primary cam and passing through a geometric center of the primary cam.

13. The conveyor system of claim 12, wherein the shoe further comprises a cam follower attached to the body of the shoe at a location below the bearing surface of the first skid and the bearing surface of the second skid when the shoe is positioned in an upright position, the cam follower engageable with the receiving portion of the secondary cam, whereupon rotation of the secondary cam moves the shoe from the exit of the upper support member to the entrance of the lower support member.

14. The conveyor system of claim 1, further comprising a cam follower attached to the body of the shoe at a location below the bearing surface of the first skid and the bearing surface of the second skid when the shoe is positioned in an upright position, a pair of rollers attached to the body of the shoe at a location below the bearing surface of the first skid and the bearing surface of the second skid when the shoe is positioned in an upright position, and wherein the cam follower is positioned between the two rollers.

15. The conveyor system of claim 14, wherein the pair of rollers are engageable with the upper horizontal leg of the lower support member when the shoe is positioned adjacent the lower support member.

16. The conveyor system of claim 1, wherein the endless transport member is comprised of a roller chain.

17. The conveyor system of claim 16, wherein the roller chain comprises a bushing having an outer circumferential surface which is simultaneously engageable with the horizontal leg of the upper support member and the bearing surface of the first skid, whereby moving the roller chain linearly causes the bushing to rotate about its longitudinal axis and propel the shoe at a speed greater than the speed of the chain.

18. An accumulating conveyor system comprising:
a first endless transport member;
a second endless transport member;
means for supporting the first transport member;
means for supporting the second transport member; and
a first pallet assembly that includes a first shoe slideably engageable with the first transport member, a second shoe slideably engageable with the second transport member, and a plate member for supporting a workpiece being transported by the conveyor system, the plate member having one end detachably connected to the first shoe and another end detachably connected to the second shoe, wherein the first shoe comprises a body, a first skid attached to the body and having a substantially flat bearing surface slideably engageable with the endless transport member when the shoe is positioned in an upright position, and a second skid attached to the body and having a substantially flat bearing surface slidably engageable with the endless transport member when the shoe is positioned in an upside down position, and at least one transverse roller attached to the body between the bearing surface of the first skid and the bearing surface of the second skid.

19. The conveyor system of claim 18, further comprising:
a second pallet assembly that includes a third shoe slidably engageable with the first transport member, a fourth shoe slidably engageable with the second transport member, a second plate member for supporting a workpiece being transported by the conveyor system, the plate member having one end detachably connected to the third shoe and another end detachably connected to the fourth; and
an anti-back flex chain having one end attached to the first pallet assembly and another end attached to the second pallet assembly.

20. The conveyor system of claim 18, wherein the plate member is removable from the first and second shoes without disengaging the first shoe from the first transporting means.

* * * * *